「12」 United States Patent
Lee et al.

(10) Patent No.: US 11,095,867 B1
(45) Date of Patent: Aug. 17, 2021

(54) SALIENCY PREDICTION USING PART AFFINITY FIELDS IN VIDEOS

(71) Applicant: FUJIFILM Business Innovation Corp., Tokyo (JP)

(72) Inventors: Hu-Cheng Lee, New Taipei (CN); Lyndon Kennedy, San Francisco, CA (US); David Ayman Shamma, San Francisco, CA (US)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 16/790,139

(22) Filed: Feb. 13, 2020

(51) Int. Cl.
*H04N 13/282* (2018.01)
*G06K 9/00* (2006.01)
*H04N 13/167* (2018.01)
*G06F 3/01* (2006.01)
*G06N 3/08* (2006.01)

(52) U.S. Cl.
CPC ........... *H04N 13/167* (2018.05); *G06F 3/013* (2013.01); *G06K 9/00362* (2013.01); *H04N 13/282* (2018.05); *G06N 3/08* (2013.01)

(58) Field of Classification Search
CPC .......................... H04N 13/169; H04N 13/282
USPC ........................................................... 348/43
See application file for complete search history.

(56) References Cited

U.S. PATENT DOCUMENTS 10,015,527 B1 7/2018 Banta et al.
2016/0292884 A1 10/2016 Schnittman et al.

OTHER PUBLICATIONS

Cao et al, Realtime Multi-Person 2D Pose Estimation using Part Affinity Fields, Nov. 2016, 2017 IEEE Conference on Computer Vision and Pattern Recognition (CVPR) (Year: 2016).*
Hu et al, Deep 360 Pilot: Learning a Deep Agent for Piloting through 360° C. Sports Videos, Nov. 2017, 2017 IEEE Conference on Computer Vision and Pattern Recognition (CVPR) (Year: 2017).*
Cheng et al, Cube Padding for Weakly-Supervised Saliency Prediction in 360° C. Videos, Jun. 2018, https://openaccess.thecvf.com/content_cvpr_2018/CameraReady/0700.pdf (Year: 2018).*
Cao, Z., et al., Realtime Multi-Person 2D Pose Estimation Using Part Affinity Fields, Apr. 14, 2017, 9 pgs., [online] URL: https://arxiv.org/pdf/1611.08050.pdf.
Cheng, H-T., et al., Cube Padding for Weakly-Supervised Saliency Prediction in 360 Videos, Jun. 4, 2018, 10 pgs. [online] URL: https://arxiv.org/pdf/1806.01320.pdf.
He, K., et al., Identity Mappings in Deep Residual Networks, Jul. 25, 2016, 15 pgs., [online] URL: https://arxiv.org/pdf/1603.05027.pdf.
Hu, H-H., et al., Deep 360 Pilot: Learning a Deep Agent for Pilot through 360 Sports Videos, May 4, 2017, 13 pgs., [online] URL: https://arxiv.org/pdf/1705.01759.pdf.

(Continued)

*Primary Examiner* — Amir Shahnami
(74) *Attorney, Agent, or Firm* — Procopio, Cory, Hargreaves & Savitch LLP (57) ABSTRACT

Systems and methods are provided that involve processing video to identify a plurality of people in the video; obtaining a plurality of gaze part affinity fields (PAFs) and torso PAFs from the identified plurality of people; determining orthogonal vectors from first vectors derived from the torso PAFs; determining an intersection between second vectors derived from the gaze PAFs and the orthogonal vectors; and changing a viewpoint of the video based on the intersection.

11 Claims, 6 Drawing Sheets

(56) References Cited

OTHER PUBLICATIONS

Lin, T-Y., et al., Microsoft COCO: Common Objects in Context, Feb. 21, 2015, 15 pgs. [online] URL: https://arxiv.org/pdf/1405.0312.pdf.
Ronneberger, O., et al., U-Net: Convolutional Networks for Biomedical Image Segmentation, May 18, 2015, [online] URL: https://arxiv.org/pdf/1505.04597.pdf.
Wei, S-E, et al., Convolutional Pose Machines, Apr. 12, 2016, 9 pgs., [online] URL: https://arxiv.org/pdf/1602.00134.pdf.
Yu, Y., et al., A Deep Ranking Model for Spatio-Temporal Highlight Detection from a 360 Video, Jan. 31, 2018, 9 pgs., [online] URL: https://arxiv.org/pdf/1801.10312.pdf.
Lin, Y-C., et al., Tell Me Where to Look: Investigating Ways for Assisting Focus in 360 Video, CHI 2017, 11 pgs.

\* cited by examiner

SALIENCY PREDICTION USING PART AFFINITY FIELDS IN VIDEOS

BACKGROUND

Field

The present disclosure relates generally to conference systems, and more specifically, to utilization of video to determine viewpoints.

Related Art

The number of cameras and streams that support 360° video are growing in popularity on the Internet. Users are free to select the viewpoints in these 360° videos, however, viewers selecting the viewpoints by themselves may frequently cause them to feel discomfort. While there are related art methods to automatically predict 360° viewpoints, such methods often focus on dynamic scenes and egocentric video streams.

SUMMARY

In the related art, there are no implementations for less dynamic streams like conference rooms as often found in enterprise environments. Example implementations described herein involve a geometry-based method and a learning-based method to assist in navigating in 360° videos of people interacting in conference rooms and lecture hall environments.

Aspects of the present disclosure involve a method, which can include processing video to identify a plurality of people in the video; obtaining a plurality of gaze part affinity fields (PAFs) and torso PAFs from the identified plurality of people; determining orthogonal vectors from first vectors derived from the torso PAFs; determining an intersection between second vectors derived from the gaze PAFs and the orthogonal vectors; and changing a viewpoint of the video based on the intersection.

Aspects of the present disclosure involve a non-transitory computer readable medium, storing instructions for executing a process, the instructions including processing video to identify a plurality of people in the video; obtaining a plurality of gaze part affinity fields (PAFs) and torso PAFs from the identified plurality of people; determining orthogonal vectors from first vectors derived from the torso PAFs; determining an intersection between second vectors derived from the gaze PAFs and the orthogonal vectors; and changing a viewpoint of the video based on the intersection.

Aspects of the present disclosure involve system including means for processing video to identify a plurality of people in the video; means for obtaining a plurality of gaze part affinity fields (PAFs) and torso PAFs from the identified plurality of people; means for determining orthogonal vectors from first vectors derived from the torso PAFs; means for determining an intersection between second vectors derived from the gaze PAFs and the orthogonal vectors; and means for changing a viewpoint of the video based on the intersection.

Aspects of the present disclosure involve an apparatus including a processor, configured to process video to identify a plurality of people in the video; obtain a plurality of gaze part affinity fields (PAFs) and torso PAFs from the identified plurality of people; determine orthogonal vectors from first vectors derived from the torso PAFs; determine an intersection between second vectors derived from the gaze PAFs and the orthogonal vectors; and change a viewpoint of the video based on the intersection.

Aspects of the present disclosure involve a method, which can include processing video to identify a plurality of people in the video; obtaining a plurality of gaze part affinity fields (PAFs) and torso PAFs from the identified plurality of people; executing a refinement network on the gaze PAFs and torso PAFs to determine salient portions of the video; determining a prediction from the salient portions; and changing a viewpoint of the video based on the prediction.

Aspects of the present disclosure involve a non-transitory computer readable medium, which can include instructions for processing video to identify a plurality of people in the video; obtaining a plurality of gaze part affinity fields (PAFs) and torso PAFs from the identified plurality of people; executing a refinement network on the gaze PAFs and torso PAFs to determine salient portions of the video; determining a prediction from the salient portions; and changing a viewpoint of the video based on the prediction.

Aspects of the present disclosure involve a system, which can include means for processing video to identify a plurality of people in the video; means for obtaining a plurality of gaze part affinity fields (PAFs) and torso PAFs from the identified plurality of people; means for executing a refinement network on the gaze PAFs and torso PAFs to determine salient portions of the video; means for determining a prediction from the salient portions; and means for changing a viewpoint of the video based on the prediction.

Aspects of the present disclosure involve an apparatus, which can include a processor, configured to process video to identify a plurality of people in the video; obtain a plurality of gaze part affinity fields (PAFs) and torso PAFs from the identified plurality of people; execute a refinement network on the gaze PAFs and torso PAFs to determine salient portions of the video; determine a prediction from the salient portions; and change a viewpoint of the video based on the prediction.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Ultra wide and 360° video provides a wide and immerse experience for viewers to look in any direction. For action videos, it can be hard to pan and track a proper viewport (to follow a snowboarder for example). To solve such issues, related art methods for automatic navigation and viewport selection in 360® videos have been created. Such related art implementations can be utilized by users to lower the efforts of finding salient parts by themselves, as self-choosing the viewpoint frequently may cause viewers to feel discomfort. Further, while such methods are optimized for dynamic scenarios such as surfing, snowboarding, such implementations fail in real-world applications, such as meeting in the conference room, where the attendees can remotely attend a meeting via 360° video. While a scene can contain many people, not all actors are salient.

Example implementations described herein are directed to determining salient parts among people, which is useful for enterprise environments. While there are 360° navigation products for conference calls, they often rely on spatial audio (voice) to navigate to the direction of sound source. Such implementations can encounter problems involving picking up irrelevant sounds such as coughing or sneezing, and can carry additional privacy concerns as the conversation (voices) is being actively collected and monitored. Example implementations described herein address such issues through utilizing only visual information and determining the salient part in 360° video.

Figure 1:
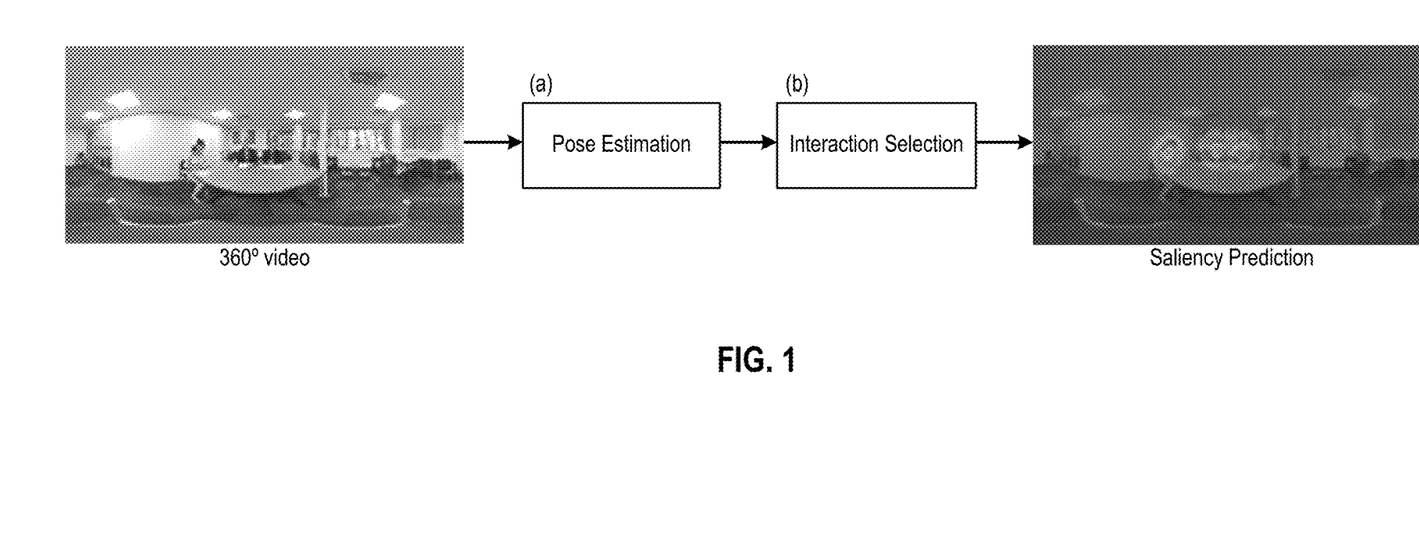
FIG. 1 illustrates an example overview of the system, in accordance with an example implementation.

Example implementations described herein involve a (1) geometry-based method and a (2) deep-learning method to solve the problem of 360° viewpoints prediction for enterprise video streams. FIG. 1 illustrates an example overview of the system, in accordance with an example implementation. Specifically, FIG. 1 illustrates an example overview of both the geometry-based and learning-based system utilized to determine the interaction (salient parts) in videos.

In the geometry-based method, example implementations identify people in the room collectively interacting through body posture and pose. Such example implementations are based on an assumption that when people interact, they will face and look at each other. As will be described herein, example implementations can obtain saliency prediction via geometry-based method.

Figure 2:
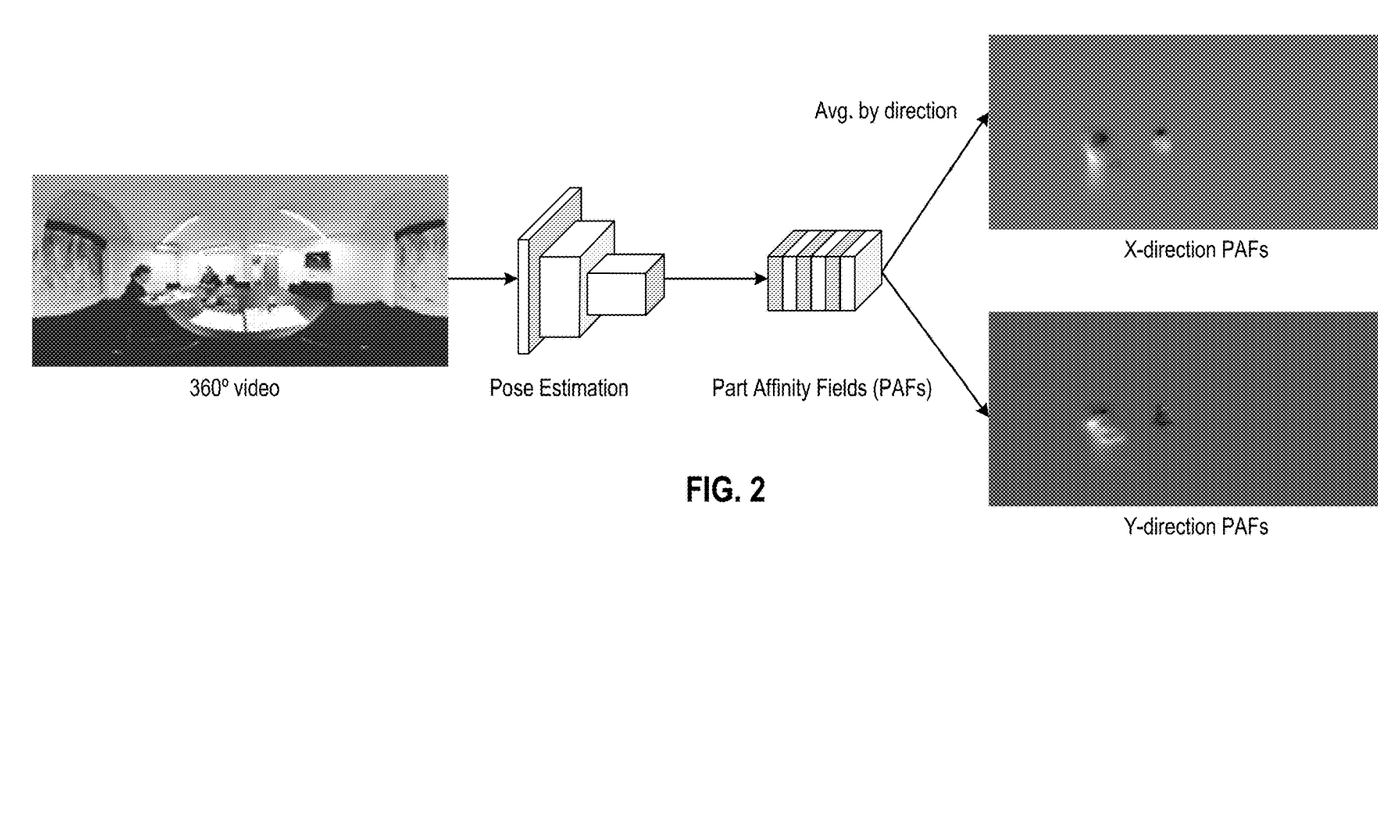
FIG. 2 illustrates an example of pose estimation, in accordance with an example implementation.

FIG. 2 illustrates an example of pose estimation, in accordance with an example implementation. Specifically, the process of FIG. 2 localizes the people in the video through utilizing realtime multi-person pose estimation pre-trained on a dataset (e.g., COCO dataset). The process obtains the part affinity fields (PAFs) which are a set of 2D vector fields that encode the location and orientation of limbs over the image domain. The process can obtain information such as the torso and gaze PAFs. The vector fields can then be averaged by direction so that the X-direction and Y-direction PAFs are utilized as the pose.

FIGS. 3(a) to 3(d) illustrate an example process for interaction selection, in accordance with an example implementation. As illustrated in FIGS. 3(a) to 3(d), example implementations classify whether the people interact with each other or not, so an interaction selection is utilized to find the salient parts.

Figure 3A:
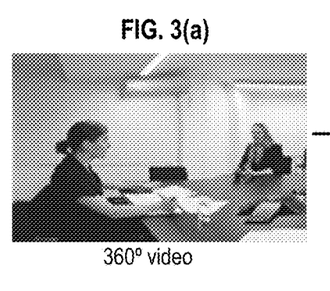
FIGS. 3(a) to 3(d) illustrate an example process for interaction selection, in accordance with an example implementation.

Specifically FIGS. 3(a) to 3(d) illustrate an example of the geometry-based method. In FIG. 3(a), the video feed is provided for processing. After locating the people in the video, example implementations classify whether people are interacting with each other or not. An assumption is made in that when people interact, they tend to face and look at each other.

Figure 3B:
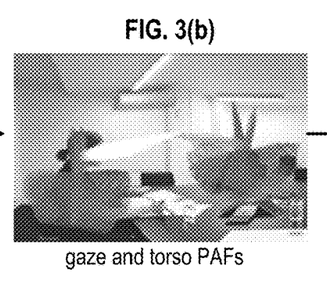

Thus, example implementations obtain the gaze and torso PAFs of people from the video of FIG. 3(a). Then, example implementations find the orthogonal vectors of torso vectors and mask the wrong direction. FIG. 3(b) illustrates example implementations involving determining the orthogonal vectors of the torso, to determine the direction each person is facing. The orthogonal vectors of the torso on 2D images are thus obtained. Then, example implementations find the interaction points between gaze vectors and body points, and between orthogonal vectors of torso and body points. In an example implementation, Gaussian kernel can be utilized on the obtained points for the saliency prediction. For the geometry-based method, constraints on the 2D plane can be added.

Figure 3C:
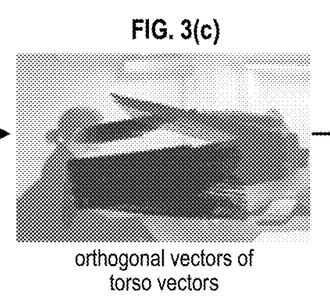

Then, example implementations mask out the wrong orthogonal vector as illustrated in FIG. 3(c). Two orthogonal vectors are obtained on the 2D plane, and the wrong vector (e.g., the vector directed away from the gaze/torso of the image) is masked. To conduct the masking, example implementations compute the angle between the gaze vectors and orthogonal vectors of the torso. If the angle is obtuse, then the vector does not have the same direction as gaze vectors, and can thereby be masked out as illustrated in FIG. 3(c).

Figure 3D:
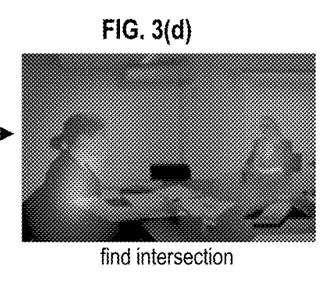

Then, example implementations determine the intersection between the vectors and the body points as illustrated in FIG. 3(d). After acquiring the gaze vectors and the correct orthogonal vectors of the torso, the example implementations find the intersection points between the gaze vectors and body points, and between the orthogonal vectors of torso and body points. As the intersection points are obtained, Gaussian kernel is added on the points as shown in FIG. 3(d).

Figure 4:
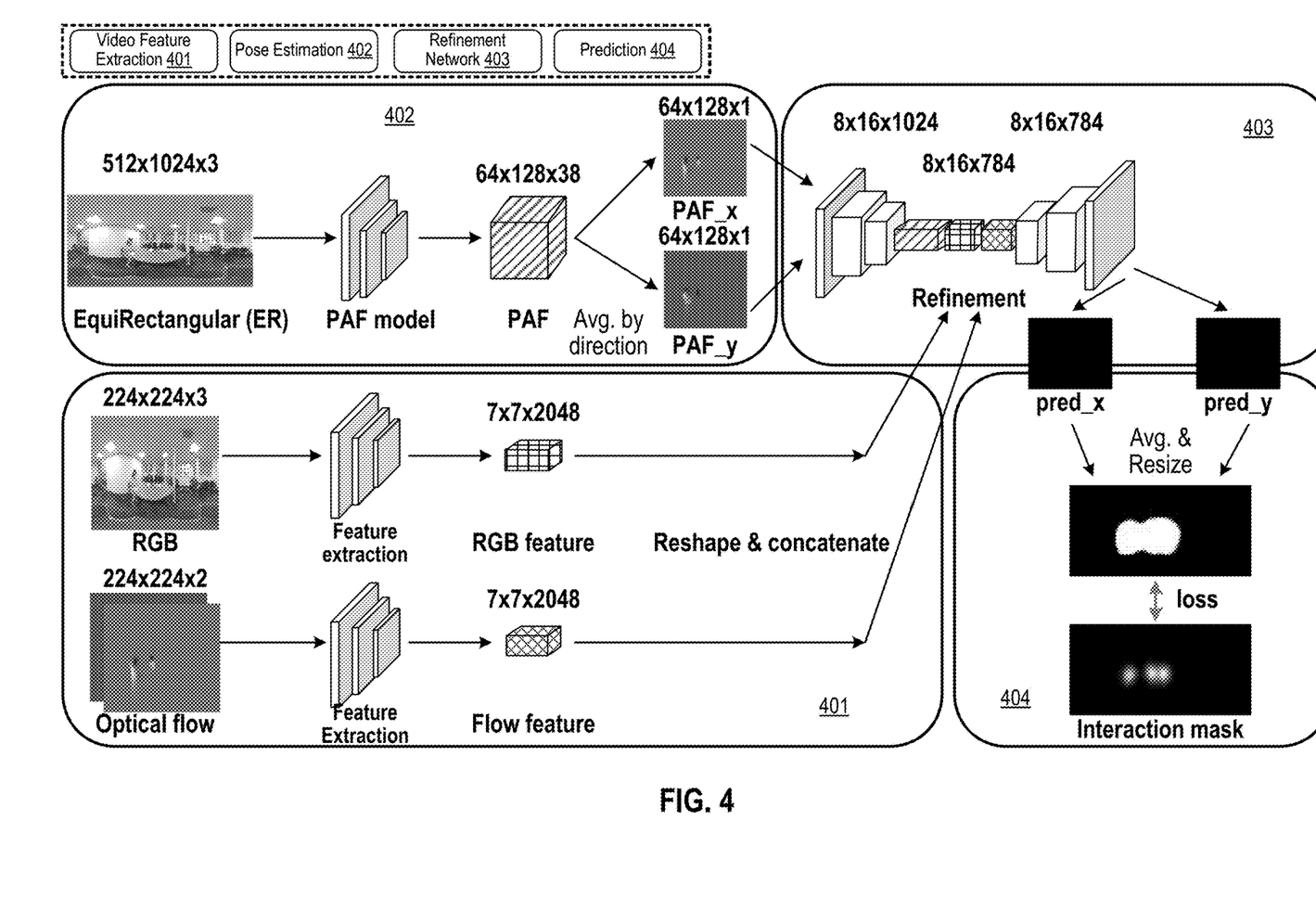
FIG. 4 illustrates an example of the learning-based method, in accordance with an example implementation.

FIG. 4 illustrates an example of the learning-based method, in accordance with an example implementation. In the learning-based method, the people in the image are located firstly, and then the example implementations classify if they are interacting or not. To locate people, the pose estimation is determined as described in FIG. 2. Then, example implementations determine a refinement network to select the salient part. Such example implementations can involve extracting the video feature from Red Green Blue (RGB) and optical flow, and the features are reshaped and fed into the refinement network. The outputs of refinement network are saliency prediction of x and y directions, and example implementations average the two predictions and resize the predictions to get the final prediction.

As related art implementations only focus on dynamic scenes and do not have a suitable dataset for less dynamic scenes such as conference calls in the meeting room, example implementations utilize datasets to learn what collective action is like without using torso geometry, as illustrated in FIG. 4.

Pose estimation 402 is the process to locate people as illustrated in FIG. 2, from which the x-direction and y-direction PAFs can be acquired. Video feature extraction 401 is directed to using a feature extractor such as ResNet50 to extract the video features from both RGB and optical flow modality. Such features are reshaped and fed into the refinement network.

Refinement network 403 is utilized to make the model learn how to select the salient parts. Implementations such as UNet, which is known for biomedical image segmentation, can be utilized as the refinement network.

Prediction 404 is obtained as the average of the predictions from the two directions as obtained from the refinement network, which is resized to provide the final prediction.

Figure 5:
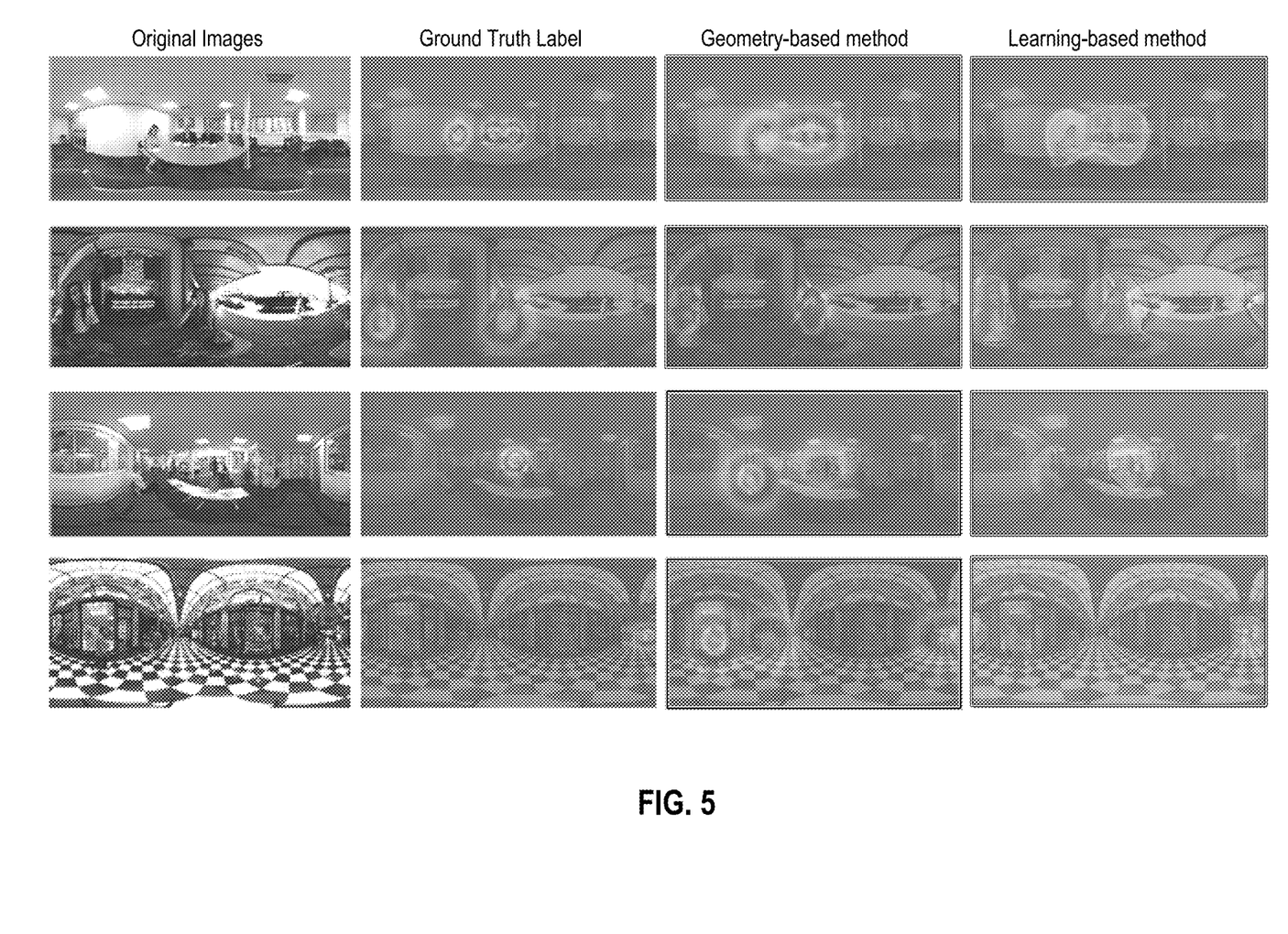
FIG. 5 illustrates example qualitative results of saliency prediction in accordance with an example implementation.

FIG. 5 illustrates example qualitative results of saliency prediction in accordance with an example implementation. From first two rows, the geometry-based method and learning-based method all perform well, and they both successfully find the salient part in the 360° video. However, there can be some limitations for 2D geometry in that the 360° video can cause distortion when it is projected to equirectangular image, and that can cause the geometry-based method to fail in some cases. However, the learning-based method still performs well in these cases.

In contrast to related art 360° navigation methods which only deal with dynamic scenes such as snowboarding and surfing, example implementations are directed to less dynamic scenes involving people interacting with each other in an enterprise environment. Related art implementations directed to the enterprise environment utilize sound, however, the example implementations utilize only visual information to determine the points of interest. Such example implementations can be an improvement over sound based implementations which have problems involving potentially focusing on irrelevant sounds, as well as privacy concerns.

Example implementations also utilize part affinity fields as the pose feature representation, which is different from the utilization of keypoints as pose feature representation in the related art.

Figure 6:
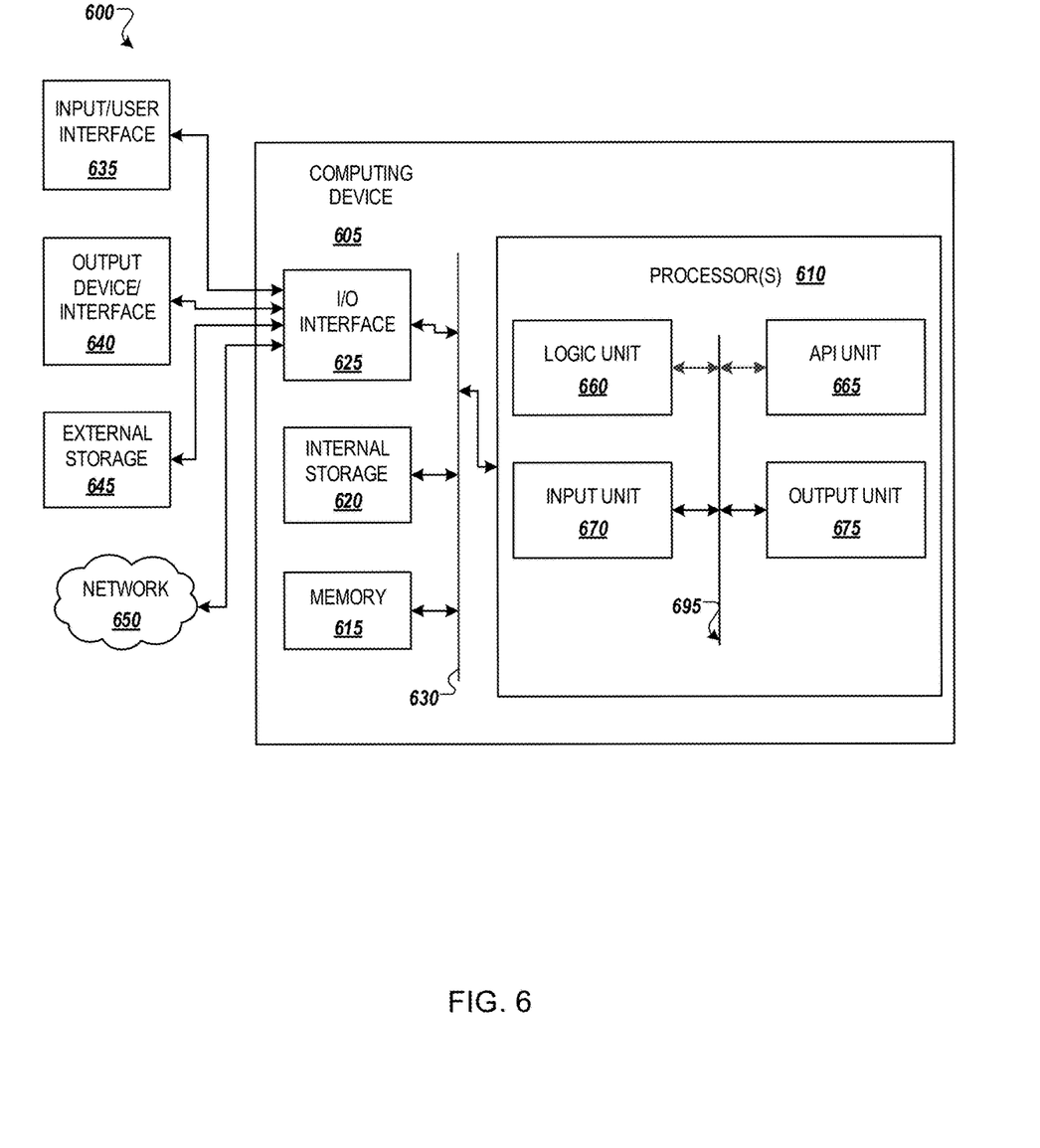
FIG. 6 illustrates an example computing environment with an example computer device suitable for use in some example implementations.

FIG. 6 illustrates an example computing environment with an example computer device suitable for use in some example implementations. Computer device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computer device 605. I/O interface 625 is also configured to receive images from cameras or provide images to projectors or displays, depending on the desired implementation.

Computer device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computer device 605. In other example implementations, other computer devices may function as or provide the functions of input/user interface 635 and output device/interface 640 for a computer device 605.

Examples of computer device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 605 can be communicatively coupled (e.g., via I/O interface 625) to external storage 645 and network 650 for communicating with any number of networked components, devices, and systems, including one or more computer devices of the same or different configuration. Computer device 605 or any connected computer device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computer device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, and inter-unit communication mechanism 695 for the different units to communicate with each other, with the OS, and with other applications (not shown). The described units and elements can be varied in design, function, configuration, or implementation and are not limited to the descriptions provided. Processor(s) 610 can be in the form of hardware processors such as central processing units (CPUs) or in a combination of hardware and software units.

In some example implementations, when information or an execution instruction is received by API unit 665, it may be communicated to one or more other units (e.g., logic unit 660, input unit 670, output unit 675). In some instances, logic unit 660 may be configured to control the information flow among the units and direct the services provided by API unit 665, input unit 670, output unit 675, in some example implementations described above. For example, the flow of one or more processes or implementations may be controlled by logic unit 660 alone or in conjunction with API unit 665.

The input unit 670 may be configured to obtain input for the calculations described in the example implementations, and the output unit 675 may be configured to provide output based on the calculations described in example implementations.

Processor(s) 610 can be configured to process video to identify a plurality of people in the video (e.g., through pose estimation as illustrated in FIG. 2), obtain a plurality of gaze part affinity fields (PAFs) and torso PAFs from the identified plurality of people as illustrated in FIG. 3(*b*); determine orthogonal vectors from first vectors derived from the torso PAFs as illustrated in FIG. 3(*c*); determine an intersection between second vectors derived from the gaze PAFs and the orthogonal vectors as illustrated in FIG. 3(*d*); and change a viewpoint of the video based on the intersection. In an example implementation, the viewpoint of the video can be directed so that the intersection is at the center of the video feed for display. In another example implementation and as described herein, processor(s) 610 can execute a Gaussian kernel on points from the determined intersection to conduct saliency prediction, and change the viewpoint of the camera according to the saliency prediction in accordance with the desired implementation. For example, the saliency prediction can be used to determine the center of the interaction between the people identified in the video.

Depending on the desired implementation the video is 360 degree video provided by a 360 degree camera. Further, also example implementations involve pose estimation to identify the plurality of people, other implementations (e.g., facial recognition, etc.) can be utilized to determine the plurality of people in accordance with the desired implementation.

As illustrated in FIGS. 3(*a*) to 3(*d*) the vectors derived from the gaze PAFs and the vectors derived from the torso PAFs are vectors on a 2D plane derived from projecting the video onto an equirectangular image. The projection of 360 degree video onto an equirectangular image can be conducted in accordance with any desired implementation.

Processor(s) 610 can also be configured to processing video to identify a plurality of people in the video (e.g., through pose estimation as illustrated in FIG. 2), obtain a plurality of gaze part affinity fields (PAFs) and torso PAFs from the identified plurality of people as illustrated in FIG. 3(*b*); execute a refinement network on the gaze PAFs and torso PAFs to determine salient portions of the video as illustrated in FIG. 4; determine a prediction from the salient portions as shown in 401 to 403 of FIG. 4; and change a viewpoint of the video based on the prediction. In an example implementation, the viewpoint of the video can be directed so that the predicted interaction is at the center of the video feed for display. In another example implementation and as described herein, processor(s) 610 can execute a Gaussian kernel on points from the determined intersection to conduct saliency prediction, and change the viewpoint of the camera according to the saliency prediction in accordance with the desired implementation. For example, the saliency prediction can be used to determine the center of the interaction between the people identified in the video.

As illustrated at 401 to 403 of FIG. 4, the refinement network can be configured to incorporate features obtained from feature extraction on RGB and optical flow of the video to determine salient portions of the video. In example implementations, the salient portions can involve predicted salient vectors of the plurality of people on an x direction and a y direction of an equirectangular image of the video as illustrated in FIG. 4 (pred_x, pred_y); wherein the processor(s) 610 is configured to determine the prediction from the sailent portions by averaging the salient vectors and resizing the averaged salient vectors to derive an interaction mask as illustrated at 404 of FIG. 4. In such example implementations, the changing the viewpoint of the video based on the prediction can involve changing a viewpoint of the camera according to the interaction mask (e.g., centering the viewpoint of the camera to place the interaction mask at the center, etc.).

Through such example implementations, the video viewpoint can focus on the interaction and can thereby eliminate the need to process sound to determine the interactions, which can protect the privacy of the people in the camera view. Further, example implementations described herein can thereby determine and identify the points of interest in passive scenes such as conversations or teleconferences.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   processing video to identify a plurality of people in the video;
   obtaining a plurality of gaze part affinity fields (PAFs) and a plurality of torso PAFs from the identified plurality of people, each of the identified plurality of people comprising a gaze PAF of the plurality of gaze PAFs and a torso PAF of the plurality of torso PAFs;
   for each of the identified plurality of people, determining orthogonal vectors from first vectors derived from the respective torso PAF of each of the identified plurality of people;
   determining a first intersection between second vectors derived from the gaze PAFs of the plurality of people and a second intersection between the orthogonal vectors of the plurality of people; and
   changing a viewpoint of the video based on the intersection.

2. The method of claim 1, wherein the video is 360 degree video.

3. The method of claim 1, wherein the processing video to identify the plurality of people in the video comprises conducting pose estimation.

4. The method of claim 1, wherein the vectors derived from the gaze PAFs and the vectors derived from the torso PAFs are vectors on a 2D plane derived from projecting the video onto an equirectangular image.

5. The method of claim 1, wherein the changing the viewpoint of the video based on the intersection comprises executing a Gaussian kernel on points from the determined intersection to conduct saliency prediction, and changing the viewpoint of the camera according to the saliency prediction.

6. A method, comprising:
   processing video to identify a plurality of people in the video;
   obtaining a plurality of gaze part affinity fields (PAFs) and a plurality of torso PAFs from the identified plurality of people, each of the identified plurality of people comprising a gaze PAF of the plurality of gaze PAFs and a torso PAF of the plurality of torso PAFs;
   executing a refinement network on the plurality of gaze PAFs and the plurality of torso PAFs to determine salient portions of the video;
   determining a prediction from the salient portions; and
   changing a viewpoint of the video based on the prediction.

7. The method of claim 6, wherein the refinement network is configured to incorporate features obtained from feature extraction on RGB and optical flow of the video to determine salient portions of the video.

8. The method of claim 6, wherein the salient portions comprises predicted salient vectors of the plurality of people on an x direction and a y direction of an equirectangular image of the video;
   wherein the determining the prediction from the sailent portions comprises averaging the salient vectors and resizing the averaged salient vectors to derive an interaction mask.

9. The method of claim 8, wherein the changing the viewpoint of the video based on the prediction comprises changing a viewpoint according to the interaction mask.

10. The method of claim 1, wherein changing the viewpoint of the video based on the intersection comprises directing the viewpoint of the video such that the intersection is at a center of the video for display.

11. The method of claim 6, wherein changing the viewpoint of the video based on the prediction comprises determining a center of interaction between the identified plurality of people and directing the viewpoint of the video such that the determined interaction is at a center of the video for display.

* * * * *